United States Patent [19]

Fuller

[11] 4,351,693

[45] Sep. 28, 1982

[54] LABEL POSITIONER

[75] Inventor: Stuart C. Fuller, Riverside, Calif.

[73] Assignee: Kerr Glass Manufacturing Corp., Los Angeles, Calif.

[21] Appl. No.: 306,248

[22] Filed: Sep. 28, 1981

[51] Int. Cl.³ .............................................. B65C 9/40
[52] U.S. Cl. ..................................... 156/556; 53/585; 156/566
[58] Field of Search ................ 156/443, 475, 486–492, 156/538, 556, 566, DIG. 14; 53/291–296, 585, 575, 577, 567

[56] References Cited

U.S. PATENT DOCUMENTS

| | | | |
|---|---|---|---|
| 2,623,673 | 12/1952 | Holstein | 53/291 |
| 4,102,728 | 7/1978 | Smith | 156/443 X |
| 4,179,863 | 12/1979 | Fresnel | 53/295 |
| 4,243,466 | 1/1981 | Lindee | 156/443 X |

Primary Examiner—David A. Simmons
Attorney, Agent, or Firm—Fitch, Even, Tabin, Flannery & Welsh

[57] ABSTRACT

A label positioner is provided to finally position tubular labels which have been partially applied to cylindrical containers by conventional label application machines. Incomplete application which may result from tight fitting tubular labels such as heat shrinkable sleeves, is corrected by a pair of rollers mounted parallel above a conveyor which carries the containers from the label application machine. The rollers are mounted horizontally and spaced apart to tangentailly contact the containers conveyed therebetween. The rollers have soft outer surfaces, and when the rollers are driven in opposite rotational directions, they apply a light brushing stroke which slides the labels to the bottom of the containers.

6 Claims, 3 Drawing Figures

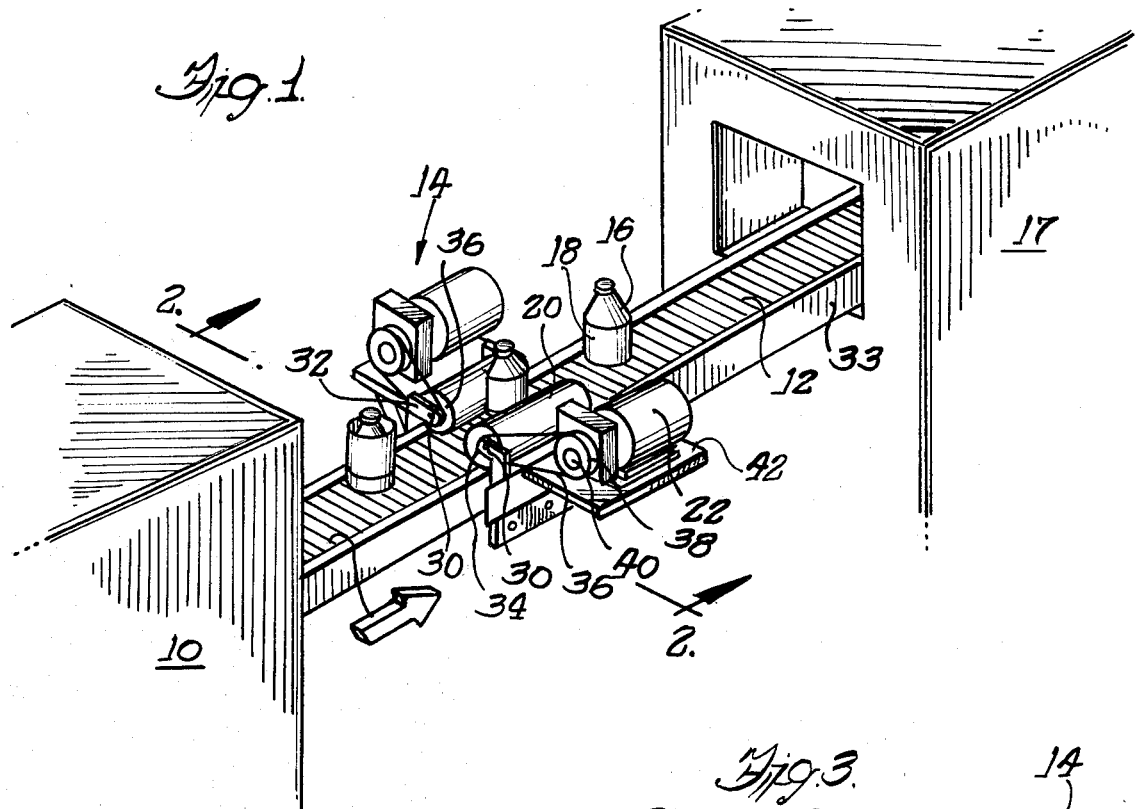
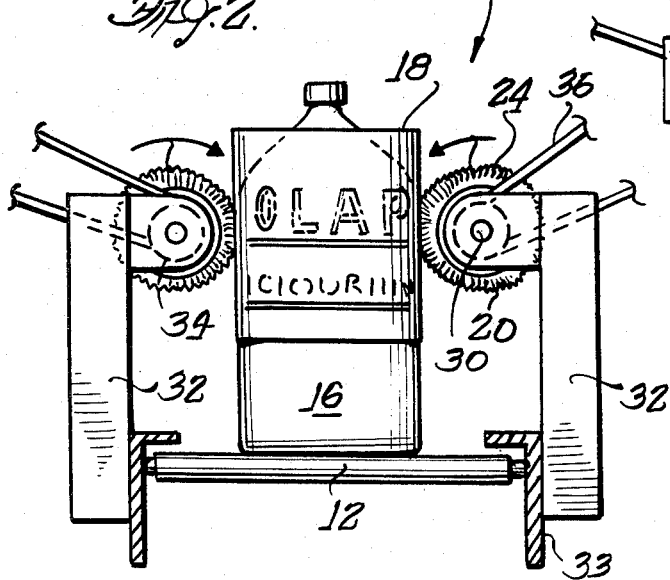
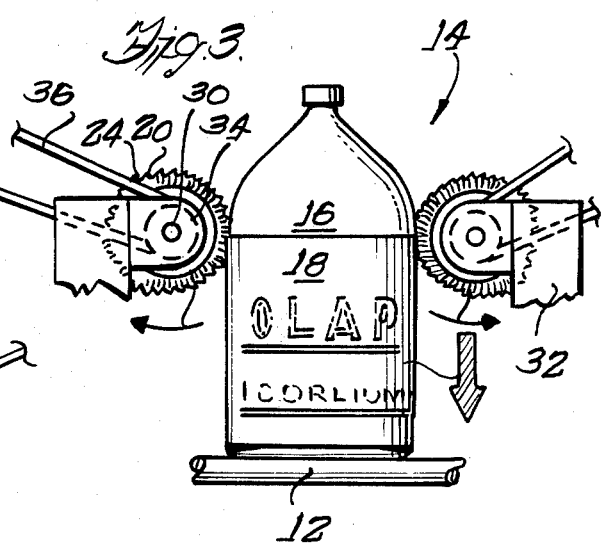

LABEL POSITIONER

The present invention relates to labeling apparatus and more particularly to apparatus for applying tubular labels to cylindrical containers.

The present invention evolved as a solution to difficulties encountered in applying heat shrinkable tubular labels to cylindrical containers. Heat shrinkable labels, e.g., labels formed from polyvinylchloride, are advantageously applied to glass bottles. Such labels give the bottles an attractive appearance as the skin-tight labels gives the impression of being formed integrally with the bottles. Perhaps more importantly, a heat shrunk label protects a bottle in several ways. The label provides a covering for the bottle that prevents the glass from being scratched and thereby weakened as may frequently occur during bottling operations. The tight fitting label supports the sidewall of the bottle giving it increased burst strength. If the bottle should be broken, the label prevents scattering of fragments, a problem particularly acute with bottles containing pressurized fluid such as carbonated beverages.

Automatic labeling machines are known which apply a pre seamed tubular label over the top of a cylindrical container. One such machine is sold under the trade name "Fuji Label Bander" by A.F. Seal. Generally the operation of the machine is as follows. Pre seamed tubular labels or sleeves are drawn from a roll of 6,000 to 8,000 labels. The labels or sleeves are cut at time of application and with the use of vacuum cups are opened and applied over cylindrical mandrels. The mandrels are synchronized to register with cylindrical containers carried by a conveyor below the mandrels. Means to slide the sleeve from the mandrels include air thrusters associated with the mandrels to initially blow the sleeves downward, tampers to tap the sleeves downward and blowers which finally position the sleeves on the containers.

It was found that the machines developed by A.F. Seal, Westlund Engineering Co., and Product Design Corp. did not in fact position the pre-seamed sleeve as required in an actual high speed, efficient production operation. The greatest single cause of this inadequacy is film (sleeve material) variances. Film thickness (from 1¼ to 3 mils), sleeve layflat dimension (118.5 nominal for the 16 oz. container) film age (PVC material stiffens with age), and the tightness of the label crease, all adversely affect the sleeve application in varying degrees with each machine.

Each machinery manufacturer controlled some of these variables in their manufacturing and testing process that gave the illusion of apparent success for the sleeve application. Some of the variables, thicker film (3 mils), larger layflat (120 to 121 mils), cold containers, and the use of dry corn starch on the inside of the sleeve, acting as a lubricant, all made their sleeve application more positive.

These variables either cannot be tightly controlled or cannot be used in actual production operation. For the pre-seamed heat shrink label, the container must be preheated to approximately 125°/130° F. No lubricant, such as corn starch, can be used; it is a potential contaminate. Film thickness can be controlled, but the trend is to go to a thinner film (1 to 1¼ mil), which makes sleeve application more difficult with the present application equipment.

The final label positioner circumvents all the problems encountered with each of the sleeve application machines.

It is generally an object of the present invention to provide apparatus which completes application of a tubular label that has been partially applied over the top of a cylindrical container, so that existing sleeve application machines may be used for applying sleeves of that shrinkable material.

A label positioner is provided for use in conjunction with a machine that slides tubular labels or sleeves over cylindrical containers and a conveyor which carries containers from the machine, the label positioner finally positioning any sleeve which has been only partially applied by the machine. The label positioner includes a pair of parallel rollers disposed along the conveyor for contacting containers carried by the conveyor therebetween, and the rollers are rotated in opposite directions to exert a downward force to the labels thereby sliding any partially applied label fully onto the container.

These and other objects and advantages of the invention will become more apparent from the following detailed description of the invention in reference to the accompanying drawing in which:

FIG. 1 is a perspective view of equipment for applying heat shrinkable labels to a bottle. FIG. 2 and FIG. 3 are cross sectional views taken along line 1—1 of FIG. 1.

The equipment for applying a tubular heat shrinkable label 18 to a cylindrical container, such as a glass beverage bottle 16, includes a tubular label or sleeve application machine 10 of conventional design, a conveyor 12 which carries bottles through the application machine and downstream therefrom and a label positioner indicated generally at 14, which slides any partially applied label fully downward onto a bottle. The sleeve application machine 10 is selected from several commercially available machines which apply tubular labels over the top of cylindrical bottles. In addition to the A.F. Seal machine hereinabove described, sleeve application machines are sold by Product Design Corp. and Westlund Engineering. Beyond the label positioner 14, the bottles 16 are conveyed to a heat tunnel 17 where the labels 18 are shrunk onto the bottles.

In accordance with the present invention, the label positioner 14, provided for use with the sleeve application machine 10, insures that the tubular labels 16 or sleeves are fully applied to the cylindrical bottles 18 with their lower edges closely adjacent the lower edges of the bottles. Machines, which have been used with limited success for applying pre-seamed tubular labels or sleeves to cans, bottles or the like, only partially apply heat shrinkable labels to bottles at higher production speeds due to differences of the shrinkable labels relative to label size, application temperature, label crease tightness, film material age and absence of lubricating material. The label positioner includes a pair of parallel rollers 20 that are spaced apart generally the diameter of the bottles and mounted for rotation just above and parallel to the conveyor 12. Drive means or motors 22 are connected to the rollers 20 to rotate them in opposite directions so that a portion of each roller tangentially contacts the labels of the bottles conveyed therebetween and brushes the labels downwards.

Rollers 20 with soft surfaces 24 are used to apply a light brushing stroke that slides the labels to the bottoms of the bottles without exerting an excess force which would tear or wrinkle the labels. Very suitable and inexpensive rollers 20 for use in the label positioner are rollers that are used for applying paint. Paint rollers have tufted textured surfaces which are soft, yielding, and exert a light brush stroke to the labels when rotated.

A shaft 30 extends through the axial bore, which is provided in each roller for receiving the shaft of a conventional roller handle, and each shaft is mounted for rotation between a pair of brackets 32 that are supported from one of the sides 33 of the conveyor and extend inward over the side of the conveyor. A pulley wheel 34 is mounted on each shaft 30 between an end of the roller and the adjacent bracket, and the pulley wheel is connected by a belt 36 from a pulley wheel 38 on a drive shaft 40 of the motor 22. The pulley wheel 34 on the roller shaft 30 has a diameter less than the diameter of the roller 20 so as not to contact the bottles.

In the illustrated embodiment, an individual motor 22 drives each roller 20. The motors are mounted on mounting plates 42 affixed to the opposite sides of the conveyors 12. The motor 22 turns the rollers 20 in opposite directions at generally equal speed about their parallel horizontal axes, the roller on the right (in reference to conveyor travel) turning counterclockwise and the roller on the left turning clockwise so that tangential contact of the rollers with the partially applied labels on the vertically disposed bottles applies a downward stroke to the labels. A single motor could also be rigged to drive both rollers to assure equal roller speed; however, as the rollers exert a brushing stroke rather than a positive stroke to the labels, so long as the rotational speeds of the two rollers are within about 10% of each other, the labels will be evenly moved downward.

The pressure exerted against the label 18, by the soft tufted surfaces 24 is sufficient to slide partially applied labels downward to the bottom of the bottles 16, however, when the labels are stopped at the bottoms of the bottles in contact with the conveyor surface or alternatively in contact with a rib adjacent the lower end of the bottle, the brushing of the rollers 20 against the labels 18 is insufficient to push the labels further downward and wrinkle or tear the labels.

Preferably, the roller brackets 32 are mounted from the conveyor sides 33 by adjustable slots and brackets for movement inward or outward relative to the conveyor 12 as well as vertically. Adjustability permits the label positioner 14 to be used with bottles 16 of different diameters and different heights. Further, adjustability permits adjustment of the roller pressure against the bottles 16. Similarly, the motor mountings 42 are preferably mounted from the conveyor sides 33 by adjustable slots and brackets to be moved horizontally or vertically for adjustment of belt tension at the various positions of the roller brackets.

An exemplary label positioner 14 utilizes two tufted texture paint rollers, no. 3761 manufactured by Padco, Inc. The rollers have an outside diameter of 2", and inside diameter of 1¾" and are 5" long. The rollers are mounted on 1¾" OD thin wall tubing segments 6⅓" long, and each carries a 1" diameter pulley. The rollers are mounted 2¼ inches above the conveyor for contacting the label about 3½ inches from the bottom of the bottle. Each roller is driven by a 1725 RPM ⅛ H.P. DC motor. A 5" pulley wheel on each motor shaft is connected to the pulley wheel of the adjacent shaft by a ⅜" diameter belt, and the 5:1 gear ratio results in the rollers being rotated at 8675 RPM. The motors are activated by a common control (not shown).

It can be seen that the invention provides apparatus which is simply and inexpensively constructed for correctly positioning partially applied tubular labels. The invention makes possible the utilization of currently produced sleeve application machines for applying heat shrinkable lables without alteration of the machine itself.

While the invention has been described in terms of a preferred embodiment, modifications obvious to one with ordinary skill in the art may be made without departing from the scope of the invention. For example, while the invention has been described in terms of equipment in which the bottles are carried upright, as will generally be the case, the bottles might be held in other orientations, in which case, the rollers will be disposed so that the plane of their parallel axes are generally normal to the axis of the container.

Various features of the invention are set forth in the following claims.

What is claimed is:

1. In combination
a machine for applying tubular labels over the tops of cylindrical containers, conveyor means for carrying upright cylindrical containers downstream of said machine and a label positioner downstream of said machine for completing application of partially applied labels, said label positioner comprising:
roller means disposed above said conveyor means for tangentially contacting the labels on the conveyed containers, and
drive means for rotating said roller means in a direction which applies a downward stroke to the partially applied labels.

2. A combination in accordance with claim 1 wherein said roller means comprises a pair of rollers and means supporting said rollers horizontally and parallel above said conveyor and spaced apart substantially the diameter of the containers for contacting the containers conveyed therebetween.

3. A combination in accordance with claim 2 wherein said rollers have soft outer surfaces.

4. Apparatus for completing application of tubular labels, partially applied over the upper ends of cylindrical containers, said apparatus comprising
a pair of rollers,
means mounting said rollers for rotation along parallel axes and spaced apart substantially the diameter of the cylindrical containers,
means for positioning the containers between said rollers generally normal to the plane of their parallel axes, and
drive means for rotating said rollers in opposite directions to stroke the partially applied labels toward the bottom of the containers.

5. Apparatus according to claim 4 wherein said positioning means comprises a conveyor which carries containers between said rollers.

6. Apparatus according to claim 4 wherein said rollers have soft outer surfaces.

* * * * *